Dec. 8, 1931.  E. RINEHART ET AL  1,835,524
ELECTRICAL CELL AND COMPARTMENT STRUCTURE
Filed Nov. 17, 1928   3 Sheets-Sheet 1
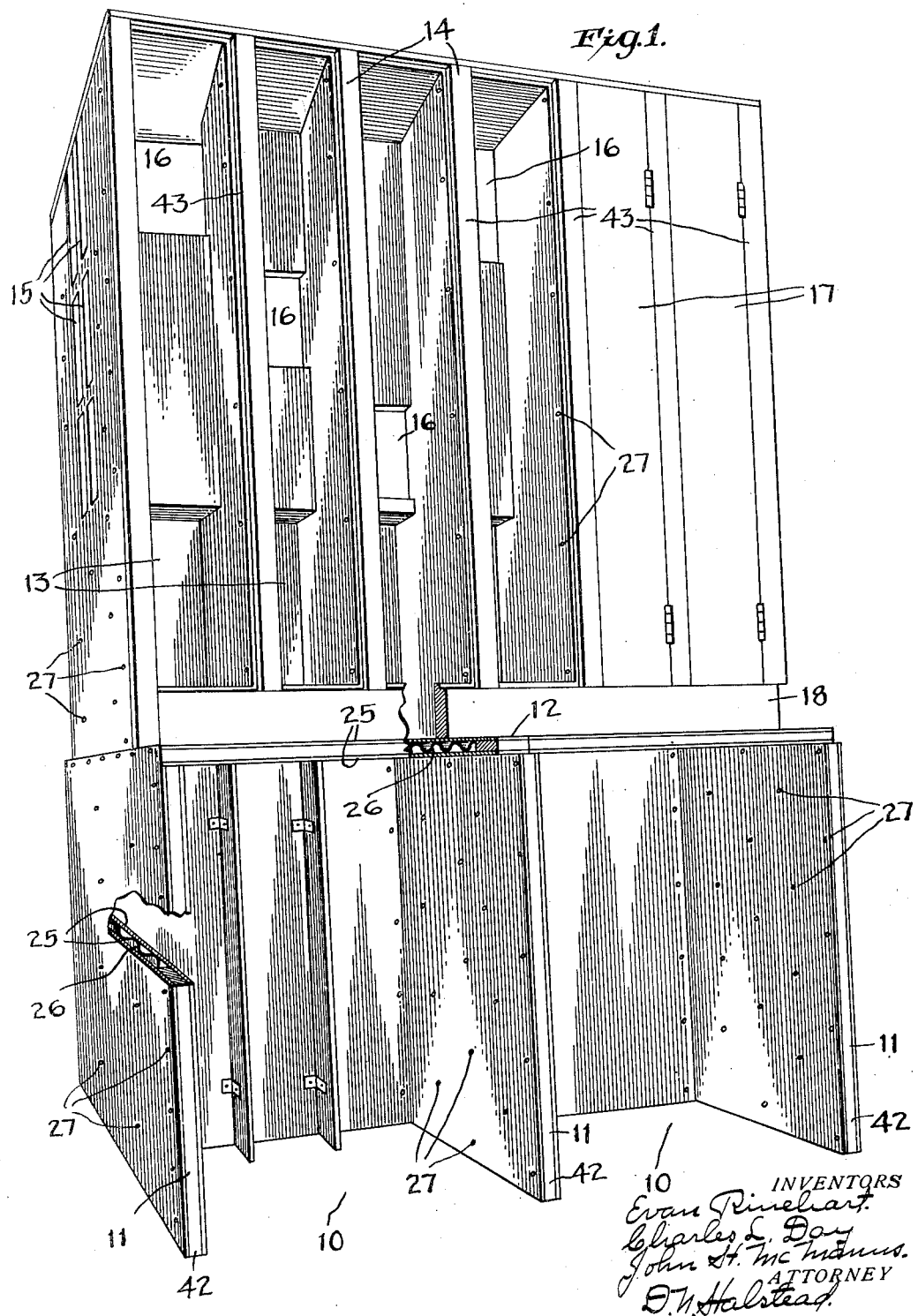

Dec. 8, 1931.   E. RINEHART ET AL   1,835,524
ELECTRICAL CELL AND COMPARTMENT STRUCTURE
Filed Nov. 17, 1928   3 Sheets-Sheet 2
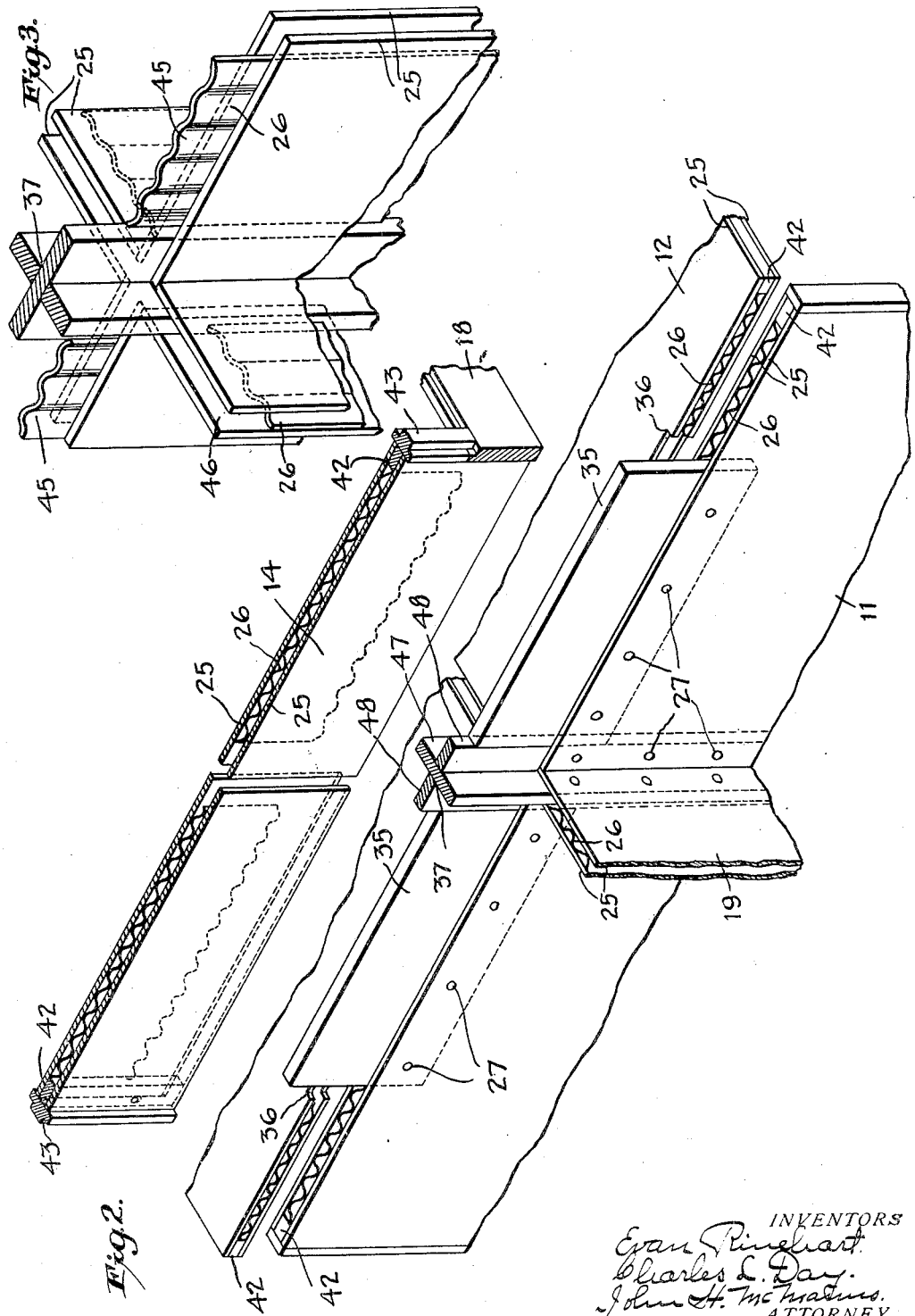

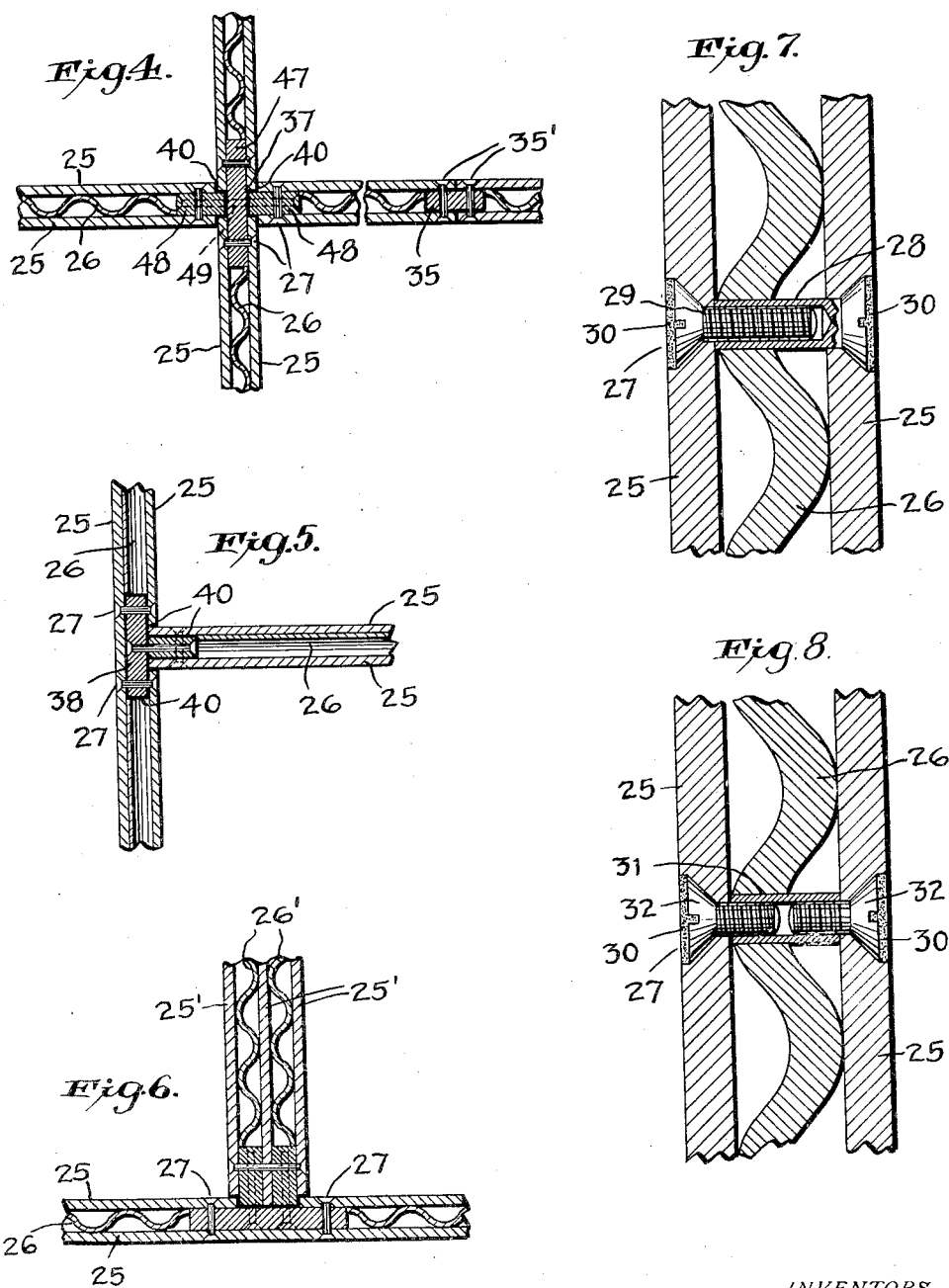

Patented Dec. 8, 1931

1,835,524

UNITED STATES PATENT OFFICE

EVAN RINEHART, OF PORT WASHINGTON, AND CHARLES L. DAY, OF HARTSDALE, NEW YORK, AND JOHN H. McMANUS, OF EAST PORTCHESTER, CONNECTICUT, ASSIGNORS TO JOHNS-MANVILLE CORPORATION, OF NEW YORK, N. Y., A CORPORATION OF NEW YORK

ELECTRICAL CELL AND COMPARTMENT STRUCTURE

Application filed November 17, 1928. Serial No. 320,200.

This invention relates to built-up or knockdown cell structures, and has for its particular object to provide a structure particularly adapted for housing electrical apparatus, the structure being of superior design and one that is easily assembled and economical as to maintenance.

Structures for this purpose that are in use at the present time are made of concrete or other poured material, or are very often of stone, gypsum or brick construction. The cell structure made in accordance with the present invention has numerous advantages over such structures of that description.

The present invention contemplates a cell or compartment structure having walls or partitions formed of panels, each of the panels comprising alternate layers of plane and corrugated sheets made of a composition material of a stone-like nature and suitably secured together. The panels have their adjoining edges formed with a tongue and groove construction so that they may be easily and quickly assembled to form an ideal electrical cell structure for housing electrical apparatus or equipment. The material of which the sheets in the panels are made is preferably a mixture of cement and asbestos, which has been subjected to sufficient pressure to make a light, strong and rigid sheet.

One of the advantages of the improved structure is that no iron or steel reinforcement is used, as such reinforcements tend to heat and thereby reduce the efficiency of the structure. An important advantage is that the material has a high refractory value and great resistance to spalling under the influence of an arc. The tendency towards cracking or disintegrating when exposed to flaming oil is reduced to a minimum. A still further advantage is that due to its built-up construction of flat and corrugated sheets, it has sufficient elasticity to distribute both electrical and mechanical shocks.

The panels are so secured together that gastight joints are provided. This is particularly advantageous in cell structures having a plurality of compartments. The electrical equipment housed in the compartments is apt to give off a gas which is inflammable. If this happens, the gas will be confined to that particular compartment, and in case of an explosion in that compartment, it will be prevented from spreading to others.

The feature of economy is brought about largely due to the fact that the panels can be completely built up or fabricated in the shop, and when shipped to the job they may be erected with a minimum amount of labor and time. In fact, the entire cell structure may be erected and set up for use with much less labor and time than it would take to put up the forms for a poured structure. A great saving in space and weight is also brought about by use of this improved cell structure.

Still other advantages will present themselves and become apparent as the specification proceeds. Referring to the drawings forming a part thereof:

Fig. 1 is a perspective view illustrating a typical installation of the improved cell structure. In this view parts are broken out to show details of construction.

Fig. 2 is a fragmentary perspective view with parts broken away and parts in section. This view is on a larger scale than Fig. 1, and the parts are separated for clearness of illustration.

Fig. 3 is a fragmentary perspective view showing a different arrangement than that illustrated in Fig. 2;

Fig. 4 is a detail sectional view showing a plurality of panels secured together by a cross member;

Fig. 5 is a detail sectional view showing panels connected at right angles to each other by a T member;

Fig. 6 is a detail sectional view of a modified construction; and

Figs. 7 and 8 are detail sectional views on a larger scale, showing a means of securing the plane and corrugated sheets together.

Referring again to the drawings, Fig. 1 illustrates a typical cell structure built in accordance with the invention and in which electrical apparatus or equipment is housed. It is to be understood that the structure illustrated in Fig. 1 is symbolic of only one arrangement. The cell structures are built up in innumerable shapes and sizes, depending entirely upon the shape and design of the electrical equipment that is to be housed in the structure. Bearing this in mind, the structure illustrated in Fig. 1 will be briefly described.

A plurality of large compartments 10 are divided by walls 11 built up of the improved panel construction described in detail hereinafter. These large compartments 10, which may house oil circuit breakers or other equipment, have a ceiling 12 which is also made up of the improved panel construction and acts as a floor for a set of smaller compartments 13 divided by the walls 14. Disconnecting switches or other electrical equipment may be housed in the compartments 13. A series of closed-in passages for bus bars are formed in the compartments 13. These passageways have entrances 15 and a separate opening 16 in each of the compartments through which the leads may come from the bus bars to the apparatus housed in the compartments 13. The compartments 13 may be provided with doors 17, two of which are indicated in the right hand side of Fig. 1. A base board 18 may be used at the front of the compartments 13.

Referring more particularly to Fig. 2, the reference numeral 12 designates the floor between the compartments 10 and 13, and 11 and 14 designate the dividing walls between the compartments 10 and 13, respectively. The particular cell structure being described is similar in the front and rear, and the wall 19 divides the front and rear compartments. The walls 11 and 14 might be made of as many panels as desired, depending upon their areas.

It will be noted that each of these panels is made up of two sheets of flat asbestos board 25 and one sheet of corrugated asbestos board 26 suitably secured together; however, a plurality of corrugated sheets may be used with or without interspacing plane or flat sheets. A means of securing the plane and corrugated sheets together is illustrated at 27 in Figs. 7 and 8. In Fig. 7 a hollow screw 28, interiorly threaded, is placed in a countersunk hole in one of the sheets 25. The hollow stem of this screw passes through an opening in the corrugated sheet 26 and abuts the other plane sheet 25. A threaded screw 29 passes through a countersunk hole in the last mentioned plane sheet 25 and engages the threaded interior of the screw 28, thus firmly holding the three sheets together and at the same time preventing the plane sheets from being drawn together to an extent sufficient to distort the corrugated sheets. A coating 30 of asbestos putty or other suitable material is placed over the heads of the screws so that the heads will not be exposed and allow the screws to act as a conductor from one compartment to another. The fastening illustrated in Fig. 8 is similar to that shown in Fig. 7, except that an independent threaded sleeve 31 and two short screws 32 are utilized for securing the sheets together. A sufficient number of the fastening devices 27, as illustrated in Fig. 1, are used to firmly and securely hold the plane and corrugated sheets of the panels together. Obviously, numerous other means might readily be used to secure the sheets together.

Novel means, preferably of a tongue and groove formation, are provided for securing the panels together. The flat sheets or plates 25 extend beyond the corrugated sheets 26, and a groove or recess is thus formed. Tongues or plate-like members 35, or a thickness equal to the height of the corrugations, are secured into the grooves or recesses, and engage similar grooves or recesses in the adjoining panel to which the tongue is secured. The tongues and the flat sheets are secured together by means of bolts or the like 35', as disclosed in Fig. 4. However, the binding or clamping action produced by the bolts or screws 29 and 32 for clamping the plates or sheets together is sufficient to make a very durable and effective joint. The plate-like tongues are made of the same material and the same process as the flat and corrugated sheets.

The floor 12 may be notched out as indicated in Fig. 2 at 36, so as to have a support on the upper part of the walls 11. When the panels forming the walls 14 are secured in position, the floor 12 will be firmly held. Additional angle brackets might be utilized for supporting the floor.

Where four vertical walls come together as shown in detail in Figs. 2 and 4, the tongues may be in the form of a cross 37, consisting of a flat plate 47 and two narrow plates 48 faced thereagainst and attached thereto by means of bolts or pins 49. The extending flat sheets are secured to the cross by the fastening means 27. Obviously, the same construction could be used where a horizontal wall and two vertical walls intersect. Fig. 5 shows in detail a tongue or connecting member 38 built in the form of a T which may be used in parts of the structure, and comprises a flat plate with one narrow plate connected to its face by means of bolts or pins the same as the cross.

In Figs. 4 and 5 a packing is indicated at 40, in the form of suitable sheet material or plastic material of a heat or fire-resisting nature, such as asbestos, rock wool or magnesia in putty or cement form. This packing forms a seal and may be used throughout the structure at all the contact points and joints, to keep gas or fluids from passing from one compartment into another, and effectively closes the cellular spaces produced by the combination of corrugated and flat sheets, and thereby renders the structure more effective as a heat and cold insulator.

Finishing strips 42 are secured or bolted in the side grooves of the panel where an open end is exposed. These finishing strips add to the appearance of the structure and greatly strengthen it. Where it is desired to have doors for the compartments, additional strips 43 may be secured or bolted to the strips 42. The strips 43 may be rabbeted for the reception of the doors 17.

Fig. 3 illustrates a form in which extensions 45 from the corrugated sheets 26 extend beyond the plane sheets 25 and act as the tongues. In the adjoining panels the plane sheets extend beyond the corrugated sheets so as to form grooves as indicated at 46 for the reception of the extended corrugated sheets of adjacent panels.

In accordance with the preferred form of the invention, the panels are fabricated and completely assembled in the shop. However, the sheets may either be counterbored at the factory with a uniform spacing of the holes and assembled on the job, or bored and assembled on the job. The tongues 35, 37 or 38 may be attached to the panels or left loose and secured in position on the job when they are installed in the completed cell structure.

Fig. 6 illustrates a form in which three plane sheets 25' and two corrugated sheets 26' are secured together. This form may be utilized where additional strength is required. If desired, additional corrugated and plane sheets may be added for further strength, and these may consist of alternating flat and corrugated sheets or a plurality of corrugated sheets placed face to face with outside side flat sheets.

As hereinabove briefly stated, sheets and plates used for these structures are made of an asbestos cement composition, and are subjected to pressure to make a hard and durable structure of a fire and heat-resisting nature. These sheets in certain preferred forms of structures are impregnated with an asphalt or bituminous composition to render them waterproof, and to give them electrical resisting properties.

It is thought from the foregoing that it will readily be apparent that a built-up cell or compartment structure of any desired shape or size may be constructed with the improved interfitting panels made up of a plurality of plane and corrugated sheets secured together.

What we claim is:

1. A cell structure formed of panels, said panels comprising alternate layers of plane and corrugated sheets of compressed asbestos and cement material, means for securing said sheets together, said sheets being so arranged that the flat sheets extend beyond the corrugated sheets on the sides to form grooves, and a tongue of like material of the same thickness as the depth of the corrugations inserted into and secured in one or more of said grooves and a fire-resisting packing material between said tongue and sheets.

2. A cell structure formed of panels, said panels comprising alternate layers of preformed plane and corrugated sheets of asbestos and cement material, means for securing said sheets together, said sheets being so arranged that the flat sheets extend beyond the corrugated sheets on the sides to form grooves, tongues of the same thickness as the depth of the corrugations inserted into and secured in one or more of said grooves and finishing strips of the same thickness as the depth of the corrugations inserted into and secured in one or more of said grooves and the outer edges of said finishing strips being flush with the edges of the plane sheets.

3. A cell structure formed of panels, said panels comprising alternate layers of preformed plane and corrugated sheets made of a compressed asbestos and cement material, means for securing said sheets together, said sheets being so arranged that the flat sheets extend beyond the corrugated sheets on the sides to form grooves, and tongues of like material attached to each other at right angles, said tongues being of the same thickness as the depth of the corrugations, and cooperating with said grooves in said panels, the joints between said sheets and tongues being sealed with fire-resisting material.

4. A panel for a cell structure, said panel comprising alternate layers of preformed plane and corrugated sheets made of compressed asbestos and cement material, and means for securing said sheets together, said sheets being so arranged that the flat sheets extend beyond the corrugated sheets on the sides to form grooves, said securing means having shoulder means to limit the clamping action thereof.

5. In a knock-down fireproof compartment structure comprising panels assembled together to form a plurality of cells, each panel comprising a plurality of preformed compressed flat and corrugated plates of asbestos cement material, the flat plates overlapping the corrugated plates leaving recesses at the edges, preformed compressed flat plates of asbestos cement material adapted to fit said recesses for connecting the panel together, and replaceable means for clamping all the plates together, the joints between the panels and the plates being sealed with a fire-resisting packing material.

6. In a knock-down fire and heat-resisting structure comprising a plurality of panels associated together to form a plurality of compartments, each panel comprising a plurality of flat and corrugated compressed sheets of asbestos cement side by side, the flat plates extending beyond the corrugated plates leaving recesses at the sides and ends, compressed plates of asbestos cement adapted to fit the recesses for connecting the panels together, and means for clamping the plates together, said compressed plates being secured together by tie means having shoulder means for limiting the clamping action.

7. In a built-up fire and heat-resisting structure comprising a plurality of panels associated together to form a plurality of compartments, each panel comprising flat and corrugated sheets of compressed asbestos cement, the flat sheets overlapping the corrugated sheets to form recesses, flat plates of compressed asbestos cement material connected in planes at right angles to each other by bolt-engaging means, the free edges of which are adapted to fit the said recesses for connecting the panels together, and means for clamping the sheets firmly together.

8. A panel structure comprising a plurality of preformed compressed flat and corrugated sheets of asbestos-cement material, the flat sheets overlapping the corrugated sheets to provide recesses at the edges, said flat sheets being anchored together by securing means having shoulders to limit the clamping action thereof, the contact points between the flat and corrugated sheets being sealed with a plastic packing material.

9. A panel structure adapted to be used for electrical cells comprising flat sheets of asbestos-cement material having corrugated sheet material therebetween, the flat plates extending beyond the corrugated sheets to form recesses, said flat sheets being anchored together by fastening means countersunk therein, the countersunk portions being filled with acid- and fume-proof material.

Signed at New York, in the county of New York, and State of New York, this 14th day of November, 1928.

EVAN RINEHART.
CHARLES L. DAY.
JOHN H. McMANUS.